United States Patent
Nair et al.

(10) Patent No.: US 8,925,055 B2
(45) Date of Patent: Dec. 30, 2014

(54) DEVICE USING SECURE PROCESSING ZONE TO ESTABLISH TRUST FOR DIGITAL RIGHTS MANAGEMENT

(71) Applicant: Azuki Systems, Inc., Acton, MA (US)

(72) Inventors: Raj Nair, Lexington, MA (US); Mikhail Mikhailov, Newton, MA (US); Kevin J. Ma, Nashua, NH (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 21 days.

(21) Appl. No.: 13/708,332

(22) Filed: Dec. 7, 2012

(65) Prior Publication Data
US 2013/0152180 A1  Jun. 13, 2013

Related U.S. Application Data

(60) Provisional application No. 61/568,032, filed on Dec. 7, 2011.

(51) Int. Cl.
*G06F 21/00* (2013.01)
*G06F 21/10* (2013.01)
*H04L 29/06* (2006.01)
*G06F 21/60* (2013.01)

(52) U.S. Cl.
CPC ............ *H04L 63/0823* (2013.01); *G06F 21/10* (2013.01); *H04L 63/12* (2013.01); *G06F 21/60* (2013.01); *H04L 2463/101* (2013.01)
USPC ................... 726/6; 713/157; 713/176; 726/26

(58) Field of Classification Search
USPC .................. 726/6, 26; 713/157, 176
See application file for complete search history.

(56) References Cited

U.S. PATENT DOCUMENTS

2008/0082828 A1* 4/2008 Jennings et al. .............. 713/176
2012/0096560 A1* 4/2012 Selander et al. ................ 726/26
2012/0303951 A1* 11/2012 Medvinsky et al. .......... 713/157

OTHER PUBLICATIONS

ARM TrustZone Security Whitepaper. ARM. Apr. 16, 2010.*
Messerges, T. S., & Dabbish, E. A. (Oct. 2003). Digital rights management in a 3G mobile phone and beyond. In Proceedings of the 3rd ACM workshop on Digital rights management (pp. 27-38). ACM.*
Stumpf, Frederic. "Trusted and Secure Mobile Platforms." (Jun. 24, 2010).*
Anand, V., Saniie, J., & Oruklu, E. (Nov. 2011). Trusted computing architectures for a mobile IT infrastructure. In Proceedings of the 39th ACM annual conference on SIGUCCS (pp. 73-78). ACM.*
Wikipedia, ARM architecture, as revised by 99.90.241.80 (talk) at 10:54, Dec. 3, 2011, downloaded on Nov. 18, 2013.

* cited by examiner

*Primary Examiner* — Carl Colin
*Assistant Examiner* — Syed Zaidi

(57) ABSTRACT

A DRM client on a device establishes trust with a DRM server for playback of digital content. The client executes in a secure execution environment, and the process includes (1) securely loading loader code from secure programmable memory and verifying it using a digital signature scheme and first key securely stored in the device; (2) by the verified loader code, loading DRM client code from the memory and verifying it using a digital signature scheme and second key included in the loader code; (3) by the verified DRM client code (a) obtaining a domain key from the memory; (b) encrypting the domain key with a device identifier using a DRM system key included in the DRM client code; and (c) sending the encrypted domain key and device identifier to the DRM server, whereby the device becomes registered to receive content licenses via secure communications encrypted using the domain key.

19 Claims, 4 Drawing Sheets

DEVICE USING SECURE PROCESSING ZONE TO ESTABLISH TRUST FOR DIGITAL RIGHTS MANAGEMENT

SUMMARY

A procedure is described for establishing trust between a computerized device (also called a "client device") and a server system for digital rights management (DRM) (also referred to as a DRM server or "backend"). The technique is applicable to devices such as mobile smartphones or tablets (more generally mobile devices) as well as fixed devices such as set top boxes. In one embodiment the device may utilize a specialized processing chipset, referred to as "system-on-chip" or SoC, that incorporates several hardware components such as processor(s), WiFi and network interface controller, content decryption and decoding, etc.

The techniques herein utilize a processing arrangement including a secure execution environment such as the arrangement known by the name TrustZone. Such an arrangement generally requires some level of specific hardware support in any physical implementation. The arrangement includes two execution environments, one being the secure environment and the other referred to as the non-secure or "normal" environment. With the exception of a secure communication channel, the normal environment does not have access to resources of the secure environment, but the secure environment has full access to all resources including secure as well as non-secure resources.

The DRM client utilizes the backend to help bootstrap a chain of trust to the backend, so that DRM licenses can be served to enable protected content to be played. Key aspects of establishing the root of trust of the device and the application to the backend are described.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Figure 1:
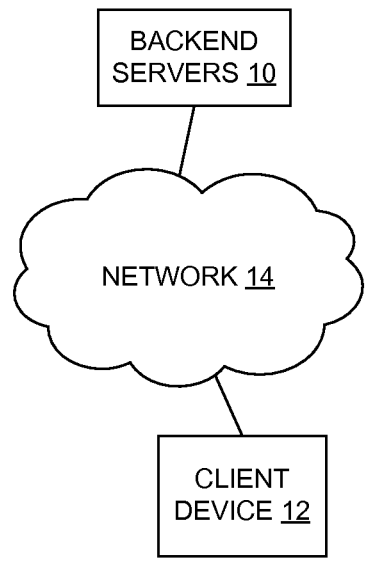
FIG. 1 is a block diagram of a networked system for content delivery and playback.

FIG. 1 is a simplified view showing pertinent components of a networked system for storing, delivering and playing protected content such as encrypted video files. In this simplified view, the system includes a set of backend servers or "backend" 10 connected to a client device 12 via a network 14. The backend 10 is described in more detail below. The client device 12 is generally a computerized device having playback capability including the decryption of encrypted content files, including for example a personal computer, tablet computer, smart phone, etc. Decryption keys used in to decrypt the encrypted content files are provided to the client device 12 by the backend 10. In operation as described more below, the client device 12 authenticates itself to the backend 10 and provides information establishing its authorization to play identified encrypted content (e.g., a particular video). The backend 10 responds by providing one or more decryption keys enabling the client device 12 to decrypt the content file(s) for the video. The client device 12 obtains the encrypted content files from a content server (not shown), decrypts them using the decryption keys, and then renders (plays) the decrypted content.

Figure 2:
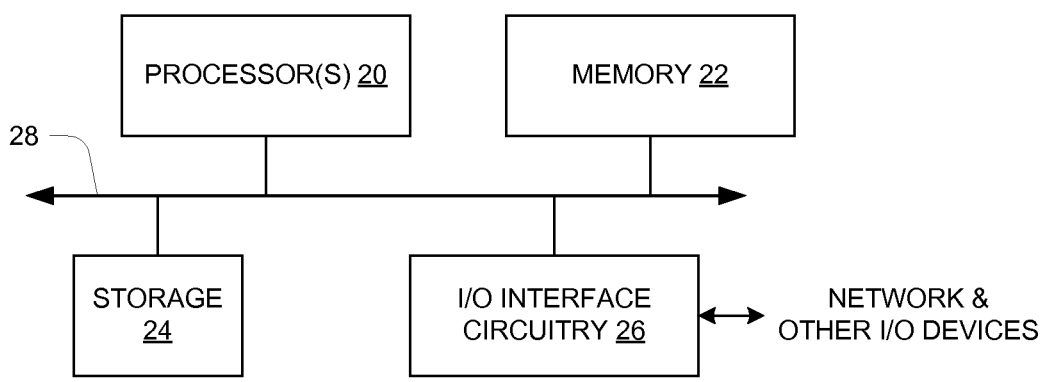
FIG. 2 is a block diagram of a hardware organization of a computerized device.

FIG. 2 is a generalized depiction of a computerized device such as may be used to realize the client device 12 and a server of the backend 10. It includes one or more processors 20, memory 22, local storage 24 and input/output (I/O) interface circuitry 26 coupled together by one or more data buses 28. The I/O interface circuitry 26 couples the device to one or more external networks (such as network 14), additional storage devices or systems, and other input/output devices as generally known in the art. System-level functionality of the device as described herein is provided by the hardware executing computer program instructions (software), typically stored in the memory 22 and retrieved and executed by the processor(s) 20. Any description herein of a software component performing a function is to be understood as a shorthand reference to operation of a computer or computerized device when executing the instructions of the software component. Also, the collection of components in FIG. 2 may be referred to as "processing circuitry", and when executing a given software component may be viewed as a function-specialized circuit, for example as a "player circuit" when executing a software component implementing a content player function. As described below, the client device 12 includes a more specialized hardware organization for purposes of security.

Figure 3:
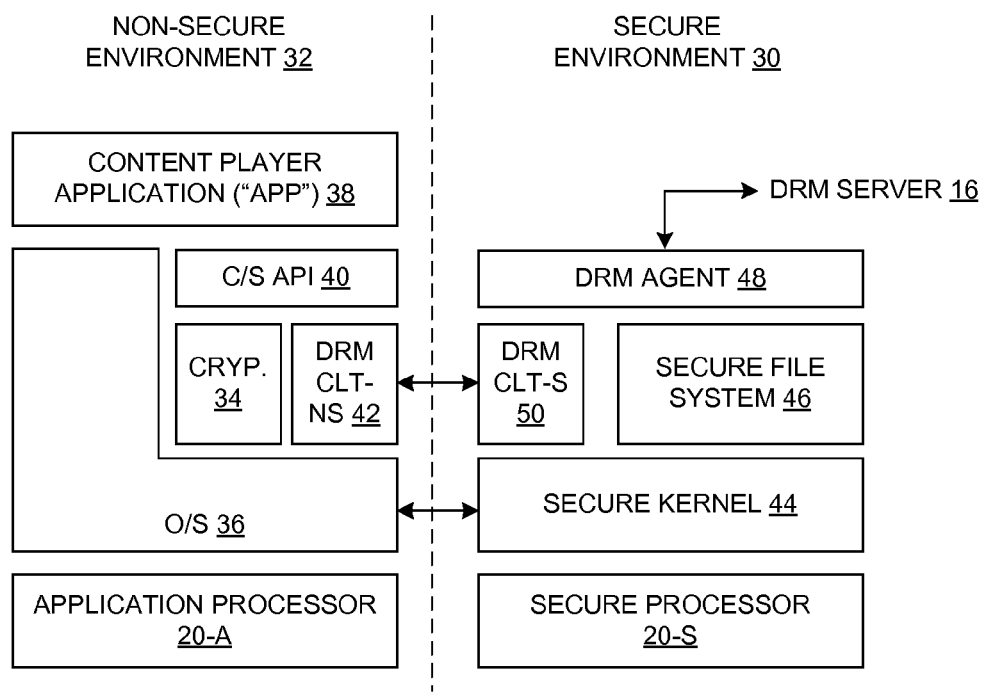
FIG. 3 is a schematic diagram of a hardware and software organization of a client device.

FIG. 3 shows the specialized organization of the client device 12. It includes a partitioning of functionality between a secure execution environment 30 and a normal or non-secure environment 32. Hardware components include an application processor 20-A in the non-secure environment 32 and a secure processor 20-S in the secure environment 30. Also included in the non-secure environment 32 is a hardware decryption circuit (CRYP) 34. Operating software in the non-secure environment includes an operating system (O/S) 36, content player application or "app" 38, chipset application programming interface (C/S API) component 40, and a non-secure (NS) portion of a DRM client (DRM CLT-NS) 42. In one embodiment, the operating system 36 may be the Android® operating system 36 for mobile devices.

The components in the secure environment 30 are responsible for establishing a root of trust with the backend 10 (FIG. 1) to enable the client device 12 to obtain decryption keys for decrypting content. It includes a secure kernel 44, secure file system 46, and DRM agent 48. It also includes a secure (S) portion of the DRM client (DRM CLT-S) 50 that works together with the non-secure DRM client 42 to establish the necessary trust as described below. In the remaining description the term "DRM client" may be used to refer to the paired DRM client portions 42, 50 as a single unit.

The non-secure DRM client 42 is mainly an interface (via the API component 40) between the content player 38 and the secure DRM client 50. In particular, the non-secure DRM client 42 only sends requests to the latter to register the device 12, obtain a rights object for a particular media object, and enable decryption and playing of the media object. The DRM Agent 48 is an API layer to access the backend servers 10.

In one embodiment, the secure environment 30 may employ components of the so-called TrustZone family, including the secure processor 20-S realized according to the ARM architecture, as well as the secure kernel 44 and secure file system 46 which are specially tailored for security-related uses. Establishing a root of trust is based on security features offered by the hardware (SOC chipset) that is embedded in a circuit board used to build a device (e.g., mobile phone handset). While the chipset manufacturer provides the hardware, the device manufacturer (OEM) loads firmware (code) such as the DRM client and DRM agent 48.

Figure 4:
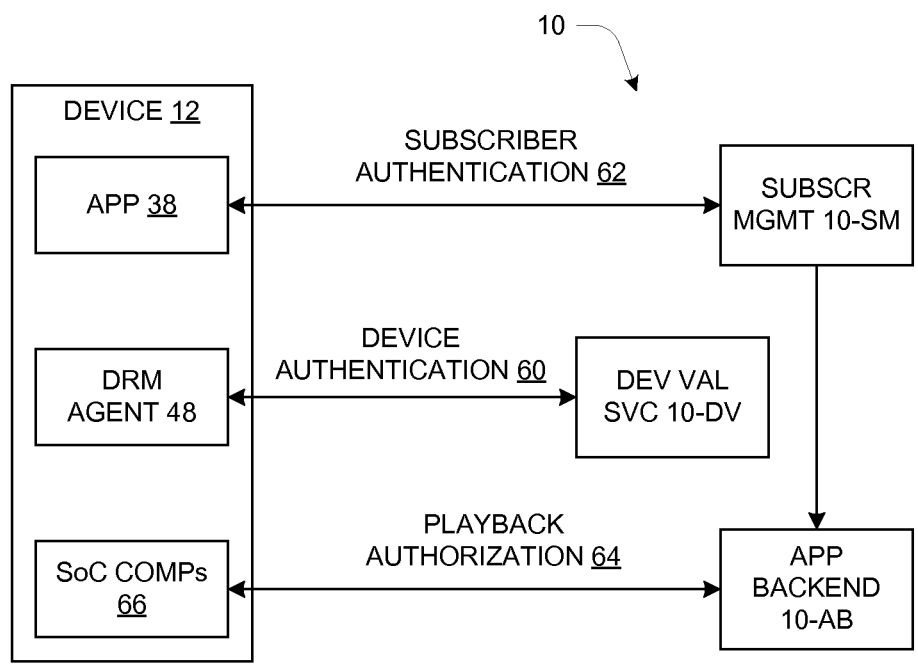
FIG. 4 is a schematic diagram showing processes performed between a device and a backend system.
Figure 5:
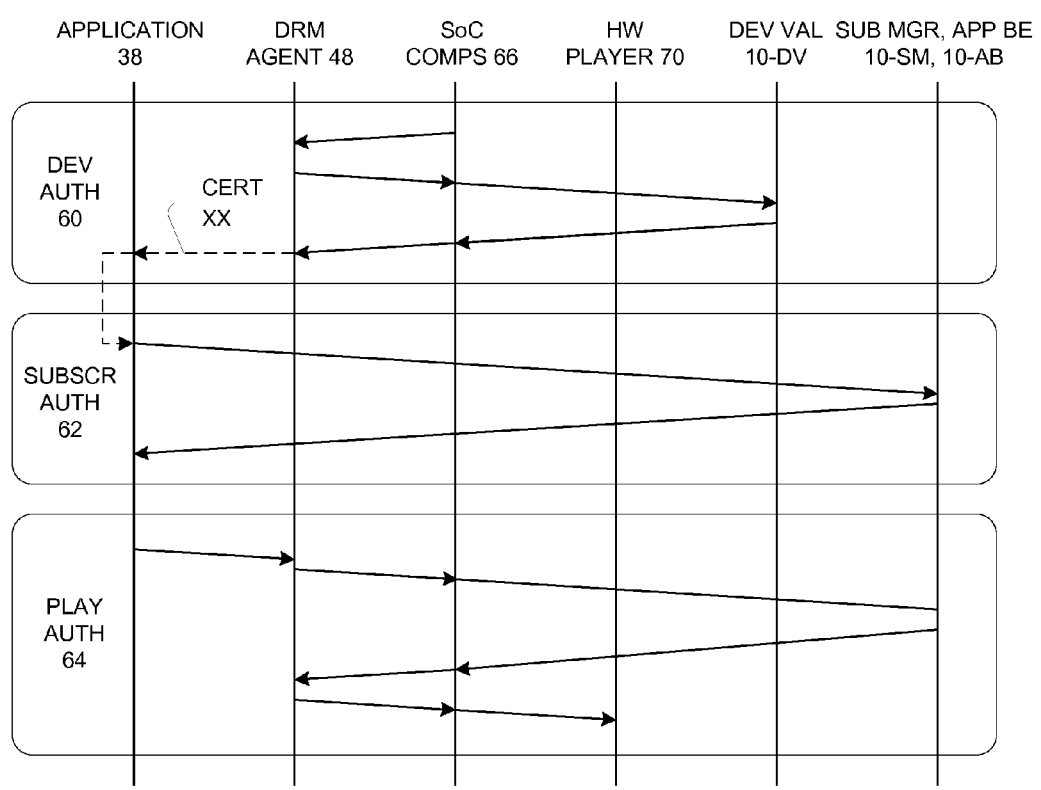
FIG. 5 is a message flow diagram for the processes of FIG. 4.

FIGS. 4 and 5 are used to describe steps taken to establish an unbroken chain of trust between the content player application 38 and the backend 10. As shown in each figure, three processes are employed. Referring to FIG. 4 in particular, a device authentication process 60 is carried out between the DRM agent 48 and a device validation service (DEV VAL SVC) 10-DV. A subscriber authentication process 62 is carried out between the app 38 and a subscriber management (SUBSCR MGMT) service 10-SM. A playback authorization 64 for playback of specific content is carried out between the application backend (APP BACKEND) 10-AB and components (SoC COMPS) 66 of the secure environment 30, including for example the secure file system 46 in which any sensitive data items are stored. Playback authorization 64 includes delivery of content-item-specific licenses and manifest files for example.

FIG. 5 generally illustrates the flow of messages during the different processes. These different exchanges are described below.

Overview

The initial step is device authentication 60 in which it is established that the device 12 is an authentic device running an unmodified version of the device O/S 36, the DRM Client (portions 42 and 44) as well as DRM agent 50. The approach used is to begin with a secure boot process involving two levels of boot using a signature scheme such as RSA-PSS (Probabilistic Signature Scheme) to verify the authenticity of the signatures of boot loaders and the DRM client. The DRM client is distributed as firmware and resides in flash memory of the device 12, not ROM. It is included in the second level boot, and thus it is necessary to authenticate the DRM client code by a process as described below. The device manufacturer uses a private key PrK to generate a signature of the firmware in the factory. This signature is verified at each boot. The DRM client is verified as part of the firmware. The device 12 also contains the manufacturer's public key PuK to verify that the binary has not been modified. This verification code is stored in SoC ROM. The PuK must not be modifiable even if it is not confidential.

Next, this root of trust is extended to include the backend 10. This involves securely sending a secret back to the backend 10. At this point, the backend 16 has verified the authenticity of the device 12 and indirectly the authenticity of the client software. An application client that authenticates to its application backend server can subsequently use the DRM agent 48 to request a media play. The DRM agent 48 uses client-certificates for mutual authentication when talking to the backend 10 for verifying trust and obtaining rights object containing licenses pertaining to the specific device and the media selected. A content key is securely conveyed to the hardware player and the media is decrypted and rendered on the screen of the device 12. This workflow is shown in FIG. 5.

Phase 1—Establishing Root of Trust

Establishing a root of trust begins with a secure boot procedure. This is implemented using the secure execution environment 30 (e.g., ARM TrustZone) in addition to some hardware mechanisms that may be manufacturer-specific.

For the secure boot process, in one embodiment a manufacturer-specific private key PvK is used to generate a signature of the firmware at its creation point. The DRM client may be deployed in this manner. The chain of trust begins with one component—SoC ROM. Ideally, the corresponding public key PuK is burnt into the ROM and used to authenticate the first bootloader. However, putting the PuK on the SoC ROM means it is the same for the class of devices. To prevent class-hacks, OTP (One Time Programmable) poly-silicon fuses may be used to store unique values in each SoC during device manufacture. For example, a 256-bit hash of a 2,048-bit PuK can be stored. Thus, the PuK is individualized to some collection of devices 12 and its verification is via the hash burned into the OTP fuses. The PuK itself can be loaded from flash memory. The flash would contain all PuKs that may be usable, and the specific one in use is identified by the hash.

For the code authentication, the following steps are taken at boot time (all operations in the secure environment 30):

1. The secure kernel 44 (which has basic functionality and resides in SoC ROM) starts execution in the secure environment 30. This kernel is programmed into the SoC ROM when SoC chipset is manufactured.
2. By the secure kernel 44, load PuK from flash memory to a secure location and verify it based on the hash stored on the on-chip ROM (e.g., OTP fuse array). The verification needs to check that the particular hash value matches at least one of the keys stored in the flash. This key is determined to be the PuK.
3. Also by the kernel 44, load first boot code from flash memory to a secure location and verify it using the PuK. A digital signature scheme such as a 128-bit MD5 hash may be used for the verification. The first boot code is digitally signed in the factory using the private key corresponding to PuK. During startup, a checksum of the loaded boot code is calculated. The stored signature is decrypted and the decrypted/recovered checksum is compared to the calculated checksum. A match indicates that the boot code is authentic and not tampered with.
4. Use the verified first boot code to load DRM client code (portions 42 and 50 as well as DRM agent 48) from the flash memory to a secure location and verify its signature. This verification may use a similar digital signature scheme, but in this case using a secondary PuK that is stored in the first boot code. This verification is trusted because the first boot code performing this operation was verified in the preceding step. A match of digital signatures indicates that the DRM client code is authentic and not tampered with.

Note that all communication between the secure and non-secure environments 30, 32 are via a secure API, which in the case of TrustZone is referred to as TZ-API. This communication is necessary to allow the content player 38 to communicate with the DRM agent 48.

Phase 2—Device Registration

Thus far, it has been verified that the boot loaders and the DRM client code are genuine. It is still necessary to perform device-level verification to establish for the backend 10 that the device 12 is a genuine device running a genuine O/S 36. Device authentication includes communicating certain sensitive information to the backend 10 in a secure manner. This step applies to each backend. Thus, it is required to register the device 12 for each different app 38. The device 12 is validated through a secret value by a device validation service 10-DV. The registration process is initiated by the app 38 calling a "register" API with 2 arguments: a URL pointing to the app's service backend 10-AB, and an opaque user authentication token that the app has obtained from the app's subscriber management server 10-SN (typically after a user authentication step done in the app). This triggers the authentication steps described below.

Step 1. The secure DRM client 50 sends to the device validation service 10-DV the following 4-tuple:
(1) a SHA256 hash DTH of a token (a 128-bit Domain Token (DT)) placed at the factory in the secure file system 48;
(2) a device-generated X.509 SSL client certificate signing request;
(3) the URL pointing to the app's service backend 10-AB; and
(4) an opaque user authentication token.

The DT may be generated in a secure manner in an entirely separate process, then it is stored in the validation server 10-DV. It is desirable to partition the devices 12 into sub-groups with different DTs in order to contain any damage from a breach.

The client SSL certificate signing request is generated based on a device-generated local property called "Device ID" (2048 bits long) that is stored in the secure file system 48. The Device ID is a confidential way of individualizing this device and is used as the client's private key CPrK. The Device ID is constructed at run time in the device 12 from a hardware-based random source and created only when the device registration is run. The combination of the individualized manufacturer PuK and the Device ID has a high degree of uniqueness.

The device 12 is validated in the beginning when it first needs to acquire a client certificate and thereafter to renew the certificate when DT is revoked. A client certificate is specific to the device 12 and may be used with multiple apps 38.

The above secret values are sent to the validation service 10-DV after encryption with AES 128 using DT as key. The hash DTH is not included in the encryption but sent together with the encrypted message.

The encryption with DT together with Step 2 (below) is a way to ensure the authenticity of the device 12. This is because the DT is installed into the secure file system 48 by the OEM (handset) manufacturer (or on their behalf by the chipset manufacturer) and the secure file system 48 guarantees confidentiality.

A backup value of DT also needs to be stored in the secure file system 48 in order to renew the primary DT as explained below. The SSL client certificate(s) associated with a retired DT also need to be renewed.

Step 2. The validation service 10-DV verifies DTH. This message also contains the client certificate signing request containing the client's public key CPuK and the hash CCH of the client's certificate. The server first encrypts the CCH with a DRM system private key DPrk. This is equivalent to the service 10-DV signing the client's certificate. The signature is sent back to the client. This message is encrypted using AES-128 with DT as key and salted with a nonce.

Step 3. The secure DRM client 50, after decrypting the server's response using the DT, completes the confirmation of the backend's response in the secure environment 30. At this point, only a valid device 12 could proceed to receive the contents of the message. Further, the secure DRM client 50 decrypts the certificate signature with the DRM system public key DPuK to validate the signature. It can then proceed to request playlists and rights objects from the app's backend server 10-AB.

All further client communication to the app's service backend 10-AB are via the mutually-authenticated SSL using the client certificate. The service backend 10-AB can verify the signature using the DRM system public key DPuK.

Rights objects are sent over an SSL connection and stored encrypted in the secure file system 48 (e.g., using AES encryption or public-key encryption, in which case the client's public key is stored with the encrypted rights objects). Media keys are stored in the secure file system 48 and provided to the media player in the secure environment 30. Media playback is via a hardware-based decrypt and decode mechanism.

The DT stored in the secure file system 48 may need to be renewed in the event of a security incident. This is achieved by using a revocation procedure where the old DT is renewed with a new one sent down to the device 12 after establishment of trust. In step 2 of the Device Authentication, the old DT is no longer accepted by the backend 10-DV and an error is returned with a condition that rejects the old DT. In this event, the secure DRM client 50 retries with the backup DT. After the successful acceptance of the backup DT, trust is established and a new DT is transmitted encrypted with the backup DT using AES-128. This new DT is then installed as the primary DT.

After the DT is renewed, all old client certificates issued based on this must be renewed. This is achieved by forcing a new device registration. The process may be controlled so that not all clients are forced to renew at the same time.

While various embodiments of the invention have been particularly shown and described, it will be understood by those skilled in the art that various changes in form and details may be made therein without departing from the spirit and scope of the invention as defined by the appended claims.

What is claimed is:

1. A method by which the trustworthiness of a digital rights management (DRM) client on a device is established with a DRM server system, the device being one of a population of devices requiring validation as a condition to obtaining rights to play back digital content, the method including the steps, performed in a secure execution environment of the device distinct from a normal execution environment in which a content player executes content playback, of:

securely loading loader code from secure programmable memory of the device and verifying the loader code by performing first digital signature calculations using a first manufacturer public key stored in the secure programmable memory;

by the loader code upon being verified, loading DRM client code from the secure programmable memory and verifying the DRM client code by performing second digital signature calculations using a second manufacturer public key included in the loader code; and by the DRM client code upon being verified:
obtaining a domain key from the secure programmable memory, the domain key being one of a set of distinct domain keys stored in the DRM server system for validating the devices, each domain key of the set shared by a respective sub-set of the devices;

encrypting a unique device identifier for the device using the domain key;

sending the encrypted device identifier along with a hash of the domain key to the DRM server system as part of a device registration message of a device registration process by which the device becomes registered with the DRM server system to receive the content licenses; and in response to receiving a registration response message sent by the DRM server system in response to the device registration message, (i) decrypting the registration response message using the domain key to obtain a device validation token, and (ii) subsequently using the device validation token in communications with the DRM server system to prove trustworthiness of the device for receiving the rights from the DRM server system to play back the digital content.

2. A method according to claim 1, wherein the DRM server system includes a device validation server and a separate application backend server, the device validation server responsible for validating the device and generating the device validation token, the application backend server responsible for providing the rights to the device on condition of receiving a valid device validation token from the device.

3. A method according to claim 2, further including (i) generating a client certificate and sending a certificate signing request as part of the device registration message, (ii) receiving a certificate signature from the device validation server as the device validation token, and (iii) sending the certificate signature to the application backend server along with the client certificate for use in establishing a secure communications channel by which the rights are sent to the device from the application backend server.

4. A method according to claim 3, wherein the certificate is generated based on the unique device identifier serving as a client private key, and the certificate includes a counterpart client public key for use by the application backend server in encrypting communications send to the device.

5. A method according to claim 4, further including generating the unique device identifier from a hardware random source at the time of generating the client certificate.

6. A method according to claim 3, wherein the certificate signature is generated by the device validation server using a DRM system private key for which a counterpart DRM system public key is stored in the application backend server and used by the application backend server to confirm authenticity of the client certificate.

7. A method according to claim 1, wherein the domain key is a primary domain key that can be replaced by a backup domain key in response to a security incident, and further including:

subsequent to successful device registration with the DRM server as reflected in the registration response message, receiving the backup domain key from the DRM server and storing it in the secure execution environment;

subsequently initiating a second device registration process initially using the primary domain key, the second device registration process including (i) receiving a notification that the primary domain key is no longer accepted by the DRM server, (ii) retrieving the backup domain key and using it in place of the primary domain key in a remaining part of the second device registration process.

8. A method according to claim 7, wherein the initiating of the second device registration process is forced by the DRM server as part of forcing all the devices sharing the primary domain key to contemporaneously replace the primary domain key with the backup domain key.

9. A method according to claim 1, performed in a device validation part of a three-part process performed by the device of establishing a chain of trust between a content player application on the device and an application backend of the DRM server system, the three-part process further including a subscriber authentication part and a playback authorization part, the subscriber authentication part carried out between the content player application and a subscriber management system and including use of the device validation token from the device validation part, the playback authorization part carried out between the application backend and the DRM client after successful completion of the subscriber authentication part.

10. A computerized device usable as a device for playing digital content, the device being one of a population of devices requiring validation as a condition to obtaining rights to play back digital content, comprising:

one or more processors;

memory coupled to the processors by a data bus; and

I/O interface circuitry coupled to the memory and the processors by the data bus, the I/O interface circuitry providing a connection to a network via which the device can communicate with a DRM server system;

the memory and processors forming a secure execution environment of the device distinct from a normal execution environment in which a content player executes content playback, the secure execution environment storing and executing computer instructions to cause the device to perform a method by which the trustworthiness of a digital rights management (DRM) client on the device is established with the DRM server system, the method including:

securely loading loader code from secure programmable memory of the device and verifying the loader code by performing first digital signature calculations using a first manufacturer public key stored in the secure programmable memory;

by the loader code upon being verified, loading DRM client code from the secure programmable memory and verifying the DRM client code by performing second digital signature calculations using a second manufacturer public key included in the loader code; and by the DRM client code upon being verified:

obtaining a domain key from the secure programmable memory, the domain key being one of a set of distinct domain keys stored in the DRM server system for validating the devices, each domain key of the set shared by a respective sub-set of the devices;

encrypting a unique device identifier for the device using the domain key;

sending the encrypted device identifier along with a hash of the domain key to the DRM server system as part of a device registration message of a device registration process by which the device becomes registered with the DRM server system to receive the content licenses; and in response to receiving a registration response message sent by the DRM server system in response to the device registration message, (i) decrypting the registration response message using the domain key to obtain a device validation token, and (ii) subsequently using the device validation token in communications with the DRM server system to prove trustworthiness of the device for receiving the rights from the DRM server system to play back the digital content.

11. A computerized device according to claim 10, wherein the DRM client includes two components, a first component being a non-secure component executing in the normal execution environment, a second component being a secure component executing in the secure execution environment.

12. A computerized device according to claim 10, wherein the DRM server system includes a device validation server and a separate application backend server, the device validation server responsible for validating the device and generating the device validation token, the application backend server responsible for providing the rights to the device on condition of receiving a valid device validation token from the device.

13. A computerized device according to claim 12, wherein the method performed by the device further includes (i) generating a client certificate and sending a certificate signing request as part of the device registration message, (ii) receiving a certificate signature from the device validation server as the device validation token, and (iii) sending the certificate signature to the application backend server along with the client certificate for use in establishing a secure communications channel by which the rights are sent to the device from the application backend server.

14. A computerized device according to claim 13, wherein the certificate is generated based on the unique device identifier serving as a client private key, and the certificate includes a counterpart client public key for use by the application backend server in encrypting communications send to the device.

15. A computerized device according to claim 14, wherein the method performed by the device further includes generating the unique device identifier from a hardware random source at the time of generating the client certificate.

16. A computerized device according to claim 13, wherein the certificate signature is generated by the device validation server using a DRM system private key for which a counterpart DRM system public key is stored in the application backend server and used by the application backend server to confirm authenticity of the client certificate.

17. A computerized device according to claim 10, wherein the domain key is a primary domain key that can be replaced by a backup domain key in response to a security incident, and, wherein the method performed by the device further includes:
subsequent to successful device registration with the DRM server as reflected in the registration response message, receiving the backup domain key from the DRM server and storing it in the secure execution environment;
subsequently initiating a second device registration process initially using the primary domain key, the second device registration process including (i) receiving a notification that the primary domain key is no longer accepted by the DRM server, (ii) retrieving the backup domain key and using it in place of the primary domain key in a remaining part of the second device registration process.

18. A computerized device according to claim 17, wherein the initiating of the second device registration process is forced by the DRM server as part of forcing all the devices sharing the primary domain key to contemporaneously replace the primary domain key with the backup domain key.

19. A computerized device according to claim 10, wherein the method performed by the device is a device validation part of a three-part process performed by the device of establishing a chain of trust between a content player application on the device and an application backend of the DRM server system, the three-part process further including a subscriber authentication part and a playback authorization part, the subscriber authentication part carried out between the content player application and a subscriber management system and including use of the device validation token from the device validation part, the playback authorization part carried out between the application backend and the DRM client after successful completion of the subscriber authentication part.

\* \* \* \* \*